United States Patent
Lindbergh et al.

(10) Patent No.: US 8,172,334 B2
(45) Date of Patent: May 8, 2012

(54) APPARATUS AND METHOD FOR MONITORING TUNNEL BORING EFFICIENCY

(75) Inventors: Leif R. Lindbergh, Seattle, WA (US);
Aaron J. Shanahan, Seattle, WA (US);
Ian R. Cahoon, Kent, WA (US);
Richard J. Robbins, Seattle, WA (US);
James C. Moore, Columbus, OH (US);
Brent R. Brown, Maple Grove, MN (US); Timothy J. Reilly, Kelowna, CA (US)

(73) Assignee: The Robbins Company, Solon, OH (US)

( * ) Notice: Subject to any disclaimer, the term of this patent is extended or adjusted under 35 U.S.C. 154(b) by 411 days.

(21) Appl. No.: 12/475,334

(22) Filed: May 29, 2009

(65) Prior Publication Data
US 2009/0297273 A1 Dec. 3, 2009

Related U.S. Application Data

(60) Provisional application No. 61/057,777, filed on May 30, 2008.

(51) Int. Cl.
*E21D 9/06* (2006.01)
(52) U.S. Cl. ........................................................ 299/1.8
(58) Field of Classification Search ................ 299/1.05, 299/1.8, 1.9, 58; 405/138; 702/141, 130
See application file for complete search history.

(56) References Cited

U.S. PATENT DOCUMENTS

| | | | |
|---|---|---|---|
| 3,041,055 A * | 6/1962 | Risse | ............................. 299/110 |
| 3,966,256 A | 6/1976 | Fikse | |
| 3,967,463 A | 7/1976 | Grandori | |
| 3,982,431 A * | 9/1976 | Grosso et al. | .............. 73/152.47 |
| 4,192,556 A | 3/1980 | Grandori | |
| 4,270,618 A | 6/1981 | Owens | |

(Continued)

FOREIGN PATENT DOCUMENTS

JP 07-026890 A 1/1995
(Continued)

OTHER PUBLICATIONS

International Search Report and Written Opinion mailed Jan. 11, 2010, issued in corresponding International Application No. PCT/US2009/045674, filed May 29, 2009.

*Primary Examiner* — John Kreck
(74) *Attorney, Agent, or Firm* — Christensen O'Connor Johnson Kindness PLLC

(57) ABSTRACT

A tunnel boring machine (90) having a rotating cutter head (93) that rotatably supports a plurality of cutter assemblies (10). A plurality of instrument packages (50) are attached to the rotating cutter head, each instrument package having a distal end in contact with an associated cutter assembly. The instrument packages include a plurality of sensors including an accelerometer (32), magnetometer (33) and temperature sensor (34), for monitoring the associated cutter assembly. The sensors are mounted in a distal end of the instrument packages that is biased to remain in contact with the cutter assembly. The instrument packages include a wireless transmitter, and they are interconnected in a mesh or peer to peer network. A power supply (176) such as a battery pack is provided for each instrument package. The data from the sensors may be used to control operation of the tunnel boring machine and/or to monitor the condition of the cutter assemblies.

40 Claims, 7 Drawing Sheets

U.S. PATENT DOCUMENTS

| | | |
|---|---|---|
| 4,420,188 A | 12/1983 | Robbins |
| RE31,511 E | 1/1984 | Spencer |
| 4,548,443 A | 10/1985 | Turner |
| 4,968,098 A * | 11/1990 | Hirsch et al. .................. 299/1.1 |
| 5,205,613 A | 4/1993 | Brown, Jr. |
| 5,308,151 A | 5/1994 | Sugden |
| 5,598,895 A | 2/1997 | Anderson |
| 6,142,577 A | 11/2000 | Tayama |
| 6,431,653 B1 | 8/2002 | Kleuters |
| 2003/0094312 A1 | 5/2003 | Byrd |
| 2008/0024000 A1 * | 1/2008 | Moulin et al. ............... 299/1.05 |
| 2008/0105423 A1 * | 5/2008 | Estes et al. ............... 166/250.01 |

FOREIGN PATENT DOCUMENTS

| | | |
|---|---|---|
| JP | 11-051932 A | 2/1999 |
| JP | 2001-227278 A | 8/2001 |

* cited by examiner

APPARATUS AND METHOD FOR MONITORING TUNNEL BORING EFFICIENCY

CROSS-REFERENCE TO RELATED APPLICATION

This application claims the benefit of U.S. Provisional Application No. 61/057,777, filed May 30, 2008, the disclosure of which is hereby expressly incorporated by reference in its entirety.

TECHNICAL FIELD

This invention relates generally to the field of mechanical excavation and more specifically to an apparatus and process for monitoring and controlling the efficiency of a tunnel boring machine.

BACKGROUND

A tunnel boring machine ("TBM") is a tunnel excavation apparatus that is typically used to form circular tunnels in a variety of soil and rock strata. A conventional TBM produces a smooth circular tunnel wall, typically with minimal collateral disturbance. A breakthrough that made TBMs efficient and reliable was the invention of the rotating head, developed by James S. Robbins. Initially, Robbins' TBM used strong spikes rotating in a circular motion, but the spikes would break frequently. He discovered that by replacing these grinding spikes with longer lasting rotating cutter assemblies this problem was significantly reduced. Since then, all successful modern TBMs have rotating cutter assemblies.

Since the advent of tunnel boring machines, operators and manufacturers of these machines have desired to understand and monitor how the cutting devices interact with the material being bored. Real time performance data would allow the operator to improve the efficiency and reliability of the tunnel boring operation by controlling certain operating parameters and performing timely maintenance. For example, costly delays due to component failures can be avoided by monitoring the tunnel boring machine in real-time, in order to quickly identify problems, allowing the operator to initiate appropriate corrective actions.

Additionally, machine manufacturers can adjust the design of components based on this data. Previous attempts to develop rational operating and maintenance schedules for tunnel boring machines have included the use of theoretical mathematical models, with or without simple force measurement devices, and inference of the interactions through ancillary evidence provided by operating conditions of the machine itself. Illustrative tunnel boring machines are disclosed in U.S. Pat. No. 4,548,443 and U.S. Pat. No. RE 31511, both of which are hereby incorporated by reference in their entirety. Additional illustrative prior art tunnel boring machines are disclosed in U.S. Pat. No. 5,205,613 and U.S. Pat. No. 6,431,653, both of which are hereby incorporated by reference in their entirety. U.S. Pat. No. 5,308,151 to Sugden, et al. discloses a different type of mining machine with cutters that are provided with cutter shaft strain gauges to provide a measure of the direct load on one or more roller cutter assemblies. One or more of the cutter shafts are provided with a strain gauge to provide a measure of the direct load on the roller cutter assembly. However, simple strain gauge measurements do not provide desired information on the operating performance and rotating characteristics of the cutter assemblies.

There remains a need for systems capable of providing real-time monitoring of the performance of individual cutters on tunnel boring machines, which could be used to provide early detection of problems with individual cutters, to provide information that may be used to control the machine to optimize performance and avoid unnecessary wear, and/or to monitor the conditions of the rock or other material being bored.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an aspect of the invention, an apparatus for monitoring a tunnel boring machine (TBM) during operation is disclosed, that includes a plurality of instrument packages associated with cutters on the TBM. Each instrument package is maintained in contact with the associated cutter, and includes sensor that monitor the cutter, for example an accelerometer, a temperature sensor, a magnetometer and the like. The distal end of the instrument package contacts the cutter, for example the retainer portion of the cutter. The direct contact provides accurate data for the associated cutter, for example vibration, temperature and rotational speed data. A sensor control board in the instrument package receives data from the sensors, and wirelessly transmits data to a remote receiver. The data may be used, for example, to monitor the condition of the cutter and/or TBM to detect wear or to suitably adjust the operating parameters of the TBM. A power supply provides power to the sensors and the control board. The apparatus includes means for attaching the instrument package to the TBM.

In embodiments of the apparatus, the instrument package includes a multi-axis accelerometer, and/or a second accelerometer.

In embodiments of the apparatus, each cutter assembly on the TBM has one or more instrument packages associated therewith. The instrument packages may be wirelessly interconnected in a mesh or peer to peer protocol.

In an embodiment of the apparatus, instrument package includes a base plate having a distal arm portion that supports the sensors, and the distal arm portion of the base plate is in direct contact with the associated cutter. A spring may be provided that biases the distal arm portion of the base plate towards the associated cutter assembly.

In an embodiment, a mounting bracket is fixedly mounted to the tunnel boring machine, for example fixedly attached to the cutter housing assembly, and the instrument packages include a removable portion that slidably engages the mounting bracket.

A method for operating a tunnel boring machine is also disclosed, that includes providing a plurality of instrument packages containing sensors for monitoring an associated cutter assembly, a sensor control board that receives data from the sensors, and a power supply, wherein the instrument package is in direct contact with the associated cutter assembly; and wirelessly transmitting data derived from the sensors to a remote receiver; and using the data transmitted to the remote receiver to control the operation of the tunnel boring machine.

A tunnel boring machine is also disclosed that includes a rotating cutter head that rotatably supports a plurality of cutter assemblies, each cutter assembly comprising a shaft rotatably supporting a cutter ring; instrument packages that are each associated with a cutter assembly, and means for attaching the instrument packages to the tunnel boring machine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A description of relevant portions of a tunnel boring machine having cutter assemblies, and an associated instrument package for monitoring the cutter assemblies, in accordance with the present invention will now be presented, with reference to the FIGURES, wherein like numbers indicate like parts. It will be appreciated by persons of skill in the art that the present invention may be embodied in various forms, and specific details disclosed herein are not to be interpreted as limiting, but rather as a basis for teaching persons skilled in the art to make and use the present invention.

Figure 1:
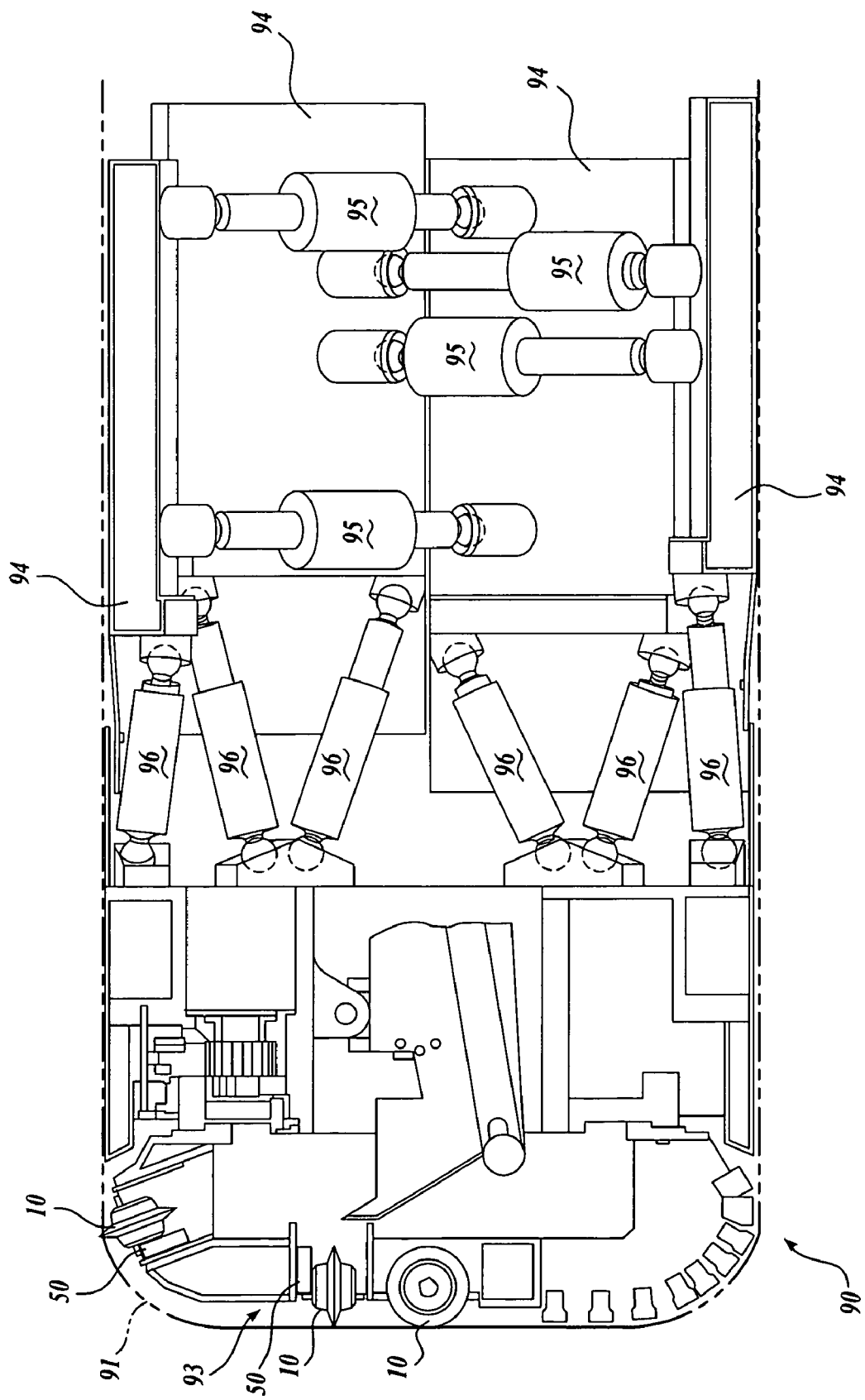
FIG. 1 schematically illustrates a tunnel boring machine showing some conventional components and including sensors for monitoring the tunnel boring machine cutter assemblies in accordance with the present invention.

An environmental side view of an illustrative tunnel boring machine 90 having cutter assemblies 10 in accordance with the present invention, is shown in FIG. 1. The illustrative tunnel boring machine 90 has a full face rotary cutter head 93 that rotatably supports a plurality of roller-type cutter assemblies 10. Although three cutter assemblies are visible in the illustration, it will be appreciated by persons of skill in the art that typical tunnel boring machines may incorporate 20, 50, 100 or more cutter assemblies 10 rotatably disposed on the cutter head 93.

In operation, the cutter head 93 is urged against a surface 91 (illustrated in phantom) such that at least some of the cutter assemblies 10 forcibly engage the surface 91. In this illustrative embodiment, one or more opposing sets of anchor shoes 94 are urged outwardly with hydraulic cylinders 95 to engage tunnel walls thereby anchoring the tunnel boring machine 90. The cutter head 93 is then urged forwardly against the surface 91 with thrust cylinders 96. The cutter head 93 rotates about a longitudinal axis so that as the cutter assemblies 10 are forcibly pressed against the surface 91, and roll along the surface 91 the cutter assemblies 10 fracture, loosen, grind, dislodge and/or break materials from the surface 91.

Figure 2:
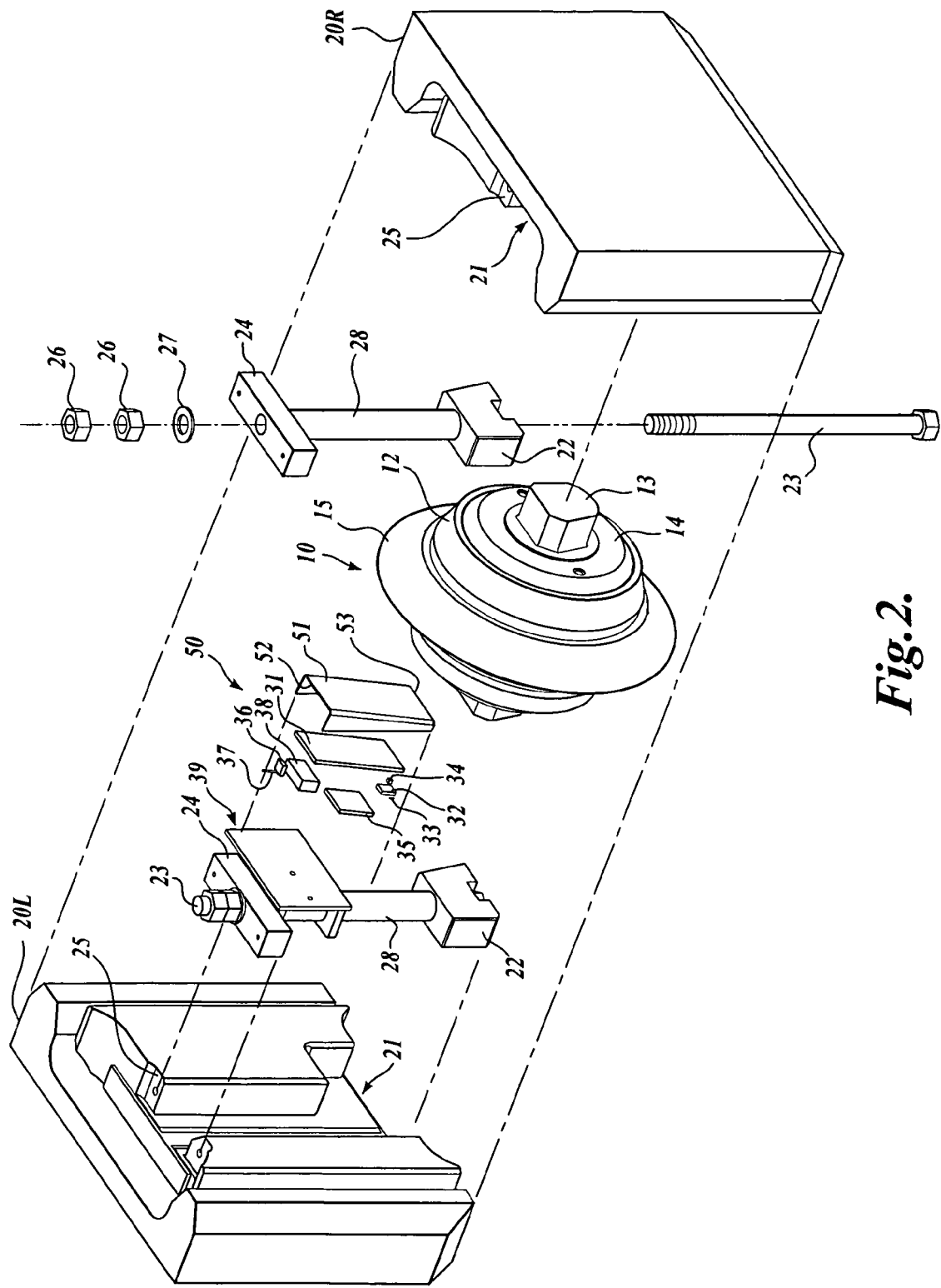
FIG. 2 is a perspective, partially exploded view of a roller-type cutter assembly of the tunnel boring machine shown in FIG. 1.
Figure 3:
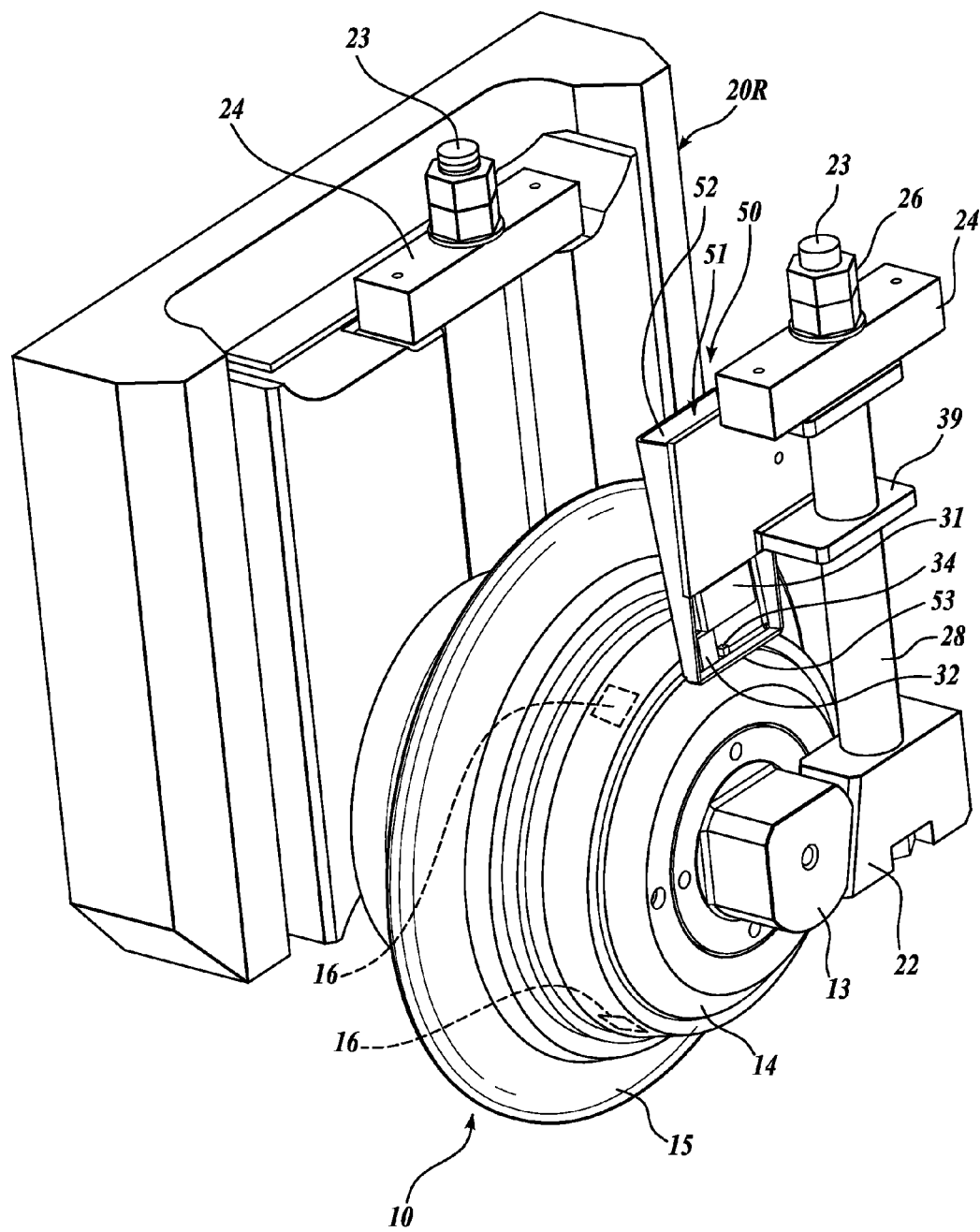
FIG. 3 is an assembled perspective view of the cutter assembly shown in FIG. 2 with a portion of the housing mounts removed for clarity.

Refer now to FIG. 2, which shows one of the cutter assemblies 10 and related mounting and monitoring components in a partially exploded view, in accordance with the present invention. An assembled perspective view is shown in FIG. 3, with some components omitted for clarity. The cutter assembly 10 includes a cutter ring 15 disposed on a hub 12 that is mounted for rotation about a shaft 13. Bearing assemblies (not shown) are mounted generally on the shaft 13 to provide for rotation of the hub 12 and cutter ring 15 about the shaft 13. In the present embodiment, one or more magnets 16 (FIG. 3) are installed on or in the rotating hub 12, the purpose of which will become apparent.

Opposite ends of the shaft 13 are secured in a cutter housing comprising spaced apart housing mounts 20L, 20R, each mounting portion defining an L-shaped channel 21. The cutter assembly 10 is installed by sliding the cutter assembly 10 such that the shaft 13 slides along the channels 21 in the housing mounts 20L, 20R, and is then shifted laterally into the recess formed by the L-shaped leg of the channels 21. After thus positioning the cutter assembly 10 between the housing mounts 20L, 20R the cutter assembly 10 is secured with a wedge-lock system which is adapted to engage the shaped ends of the shaft 13. It will be appreciated by persons of skill in the art that there are various other ways of mounting cutter assemblies to rotary head boring machines. The previous description describes a current method of mounting "back loading cutters." The present invention may also be applied with other mounting systems such as "front loading cutters."

The wedge-lock system includes a wedge 22, a clamp block 24, and a tubular sleeve 28 disposed therebetween. The wedge 22 is positioned to abut a peripheral facet near an end of the shaft 13 of the cutter assembly 10, and the clamp block 24 engages an abutment surface 25 on the housing mount 20L or 20R. A bolt 23 extends through the wedge 22, the sleeve 28, and the clamp block 24, and is secured with two nuts 26 and a washer 27. Therefore, as the bolt 23 is tensioned (by torquing the nuts 26 to a design specification), the wedge 22 locks the cutter assembly 10 in place.

An instrument package 50 attaches to the cutter assembly 10 (discussed in more detail below) to monitor the associated cutter assembly 10 during operation of the tunnel boring machine 90. In the preferred embodiment the instrument package 50 comprises a modular operating topology element, or mote, e.g., a semi-autonomous computing, communication and sensing device, as described below. In the current embodiment, the instrument package 50 attaches to one of the wedge lock assemblies with a mounting bracket 39.

In this embodiment, the instrument package 50 comprises an outer housing 51 having a proximal end 52 and a distal tip 53. The instrument package 50 is sized and positioned such that the distal tip 53 contacts and is compressively held against a retainer 14 of the cutter assembly 10. Spacers or the like (not shown) may be installed on the assembly to ensure the instrument package 50 is correctly positioned. In a current embodiment at least one Belleville washer or comparable compression mechanism is used, for example between the sleeve 28 and the wedge 22, to ensure a desired compressive fit. After the instrument package 50 is installed, the clamp block 24 is placed on the bolt 23, the washer 27 is installed, and the two nuts 26 are fastened to the bolt 23 and torqued to a design specification.

Figure 4:
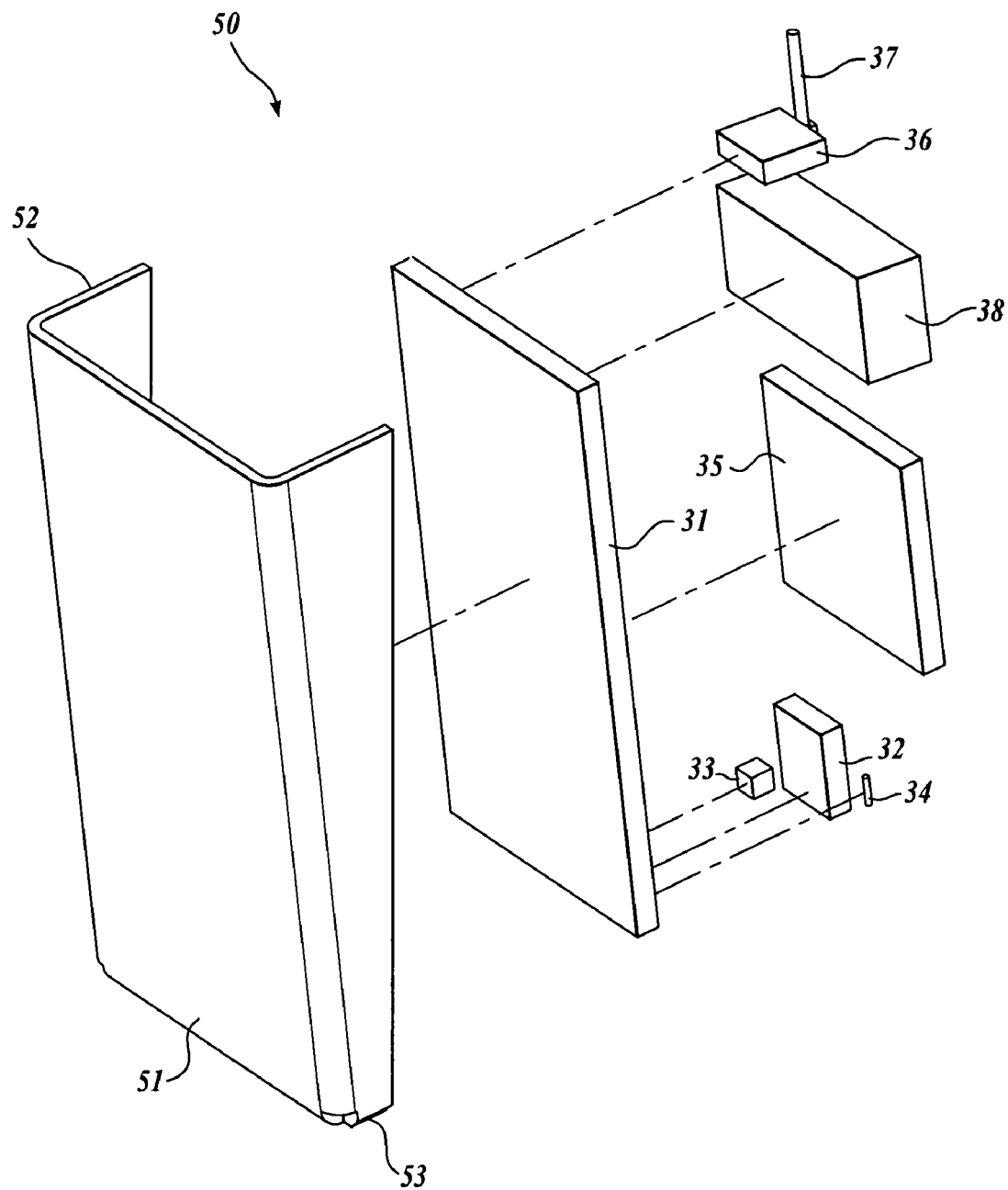
FIG. 4 is an exploded view of the instrument package for the cutter assembly shown in FIG. 2.

The outer housing 51 substantially encloses the electronic and mechanical components of the instrument package 50. Refer now also to FIG. 4, which shows an exploded view of the instrument package 50. In this embodiment the instrument package 50 includes a sensor control board assembly 31 having a processing element 35, and that is operatively connected to one or more accelerometers 32, at least one magnetometer 33 (or magnetic detector), and at least one temperature sensor, for example a thermocouple 34. It is contemplated that the instrument package 50 may include additional sensors, for example a strain gage, acoustic or optical sensor, chemical detector, or the like. The sensor control board assembly 31 further includes a wireless transceiver 36 that transmits signals in the radio frequency band through an antenna 37 to a remote receiver (not shown). The electronic sensors 32, 33, 34 and wireless transceiver 36 are powered by a battery pack 38 mounted to the sensor control board assembly 31.

The outer housing 51, when installed, contacts the cutter assembly retainer 14 such that the distal tip 53 is urged or compressively held against the retainer 14. Through this contact point, the accelerometers 32 are therefore subjected to the accelerations of the cutter assembly 10. The accelerometers 32 measure the vibration of the cutter assembly 10 during operation as the cutter ring 15 rotates along the surface 91. In one embodiment, an optional reference accelerometer (not shown) is provided that is not in direct contact with the cutter assembly 10 to enable the system to filter out non-cutter vibrations associated with the tunnel boring machine 90 operation. The vibrations detected by a reference accelerometer that is not in contact with a cutter assembly 10 would provide a reference vibration, such that the difference between the reference vibration and the vibrations measured by an accelerometer 32 associated with a particular cutter assembly 10 would provide a measure of the vibrations particularly associated with the associated cutter assembly 10.

Aspects of the load placed on the cutter assembly 10 by the boring operation can also be monitored by the accelerometer 32. It will be appreciated that the bearing assemblies in the cutter assembly 10 take most of the loads transmitted from the boring surface 91 and through the ring 15 and hub 12. These bearings are consumable parts. In order to maximize the useful life of the bearings while achieving good performance, the bearings have a load limit specified by the manufacturer. The accelerometers 32 can be used to ensure that the load limit is not exceeded.

Although only one instrument package 50 is shown with the cutter assembly 10 in FIG. 2, it is contemplated by the present invention that more than one instrument package 50 may be used with some or all of the cutter assemblies 10. For example, if instrument packages 50 are placed on both ends of the cutter assembly shaft 13, imbalances in the loading on either side of the shaft 13 can be identified by comparing the output of the accelerometers 32. An unbalanced load on the cutter assembly 10 creates a fatigue situation in which the cutter assembly 10 components are exposed to cyclical loading, which can significantly reduce the useful life of mechanical components.

Other dynamic phenomena occurring during operation of the cutter assembly 10 may be identified by analyzing the output of the output signals from the accelerometers 32, for example the tightness of the nuts 26 holding the bolt 23 in place. The vibrations of a cutter assembly 10 with a loose attachment would exhibit significantly different characteristics than a cutter assembly 10 firmly secured in the housing mounts 20L, 20R. Moreover, the vibration signature would be different if a bolt 23 on the same side as the instrument package 50 was loose, than if the bolt 23 opposite the instrument package 50 were loose.

In this embodiment, one or more magnets 16 are installed in the cutter hub 12 prior to installation of the cutter assembly 10 in the cutter housing mounts 20L, 20R. As the cutter ring 15 and the hub 12 rotate about the shaft 13, the magnet(s) 16 are detected by the magnetometer 33 in the associated instrument package 50. The time interval between successive passes of the magnets 16 can be used to calculate the rotational speed of the cutter ring 15. Then, knowing the position of the particular cutter assembly 10 on the cutter head 93 and the rotational speed of the cutter head 93, the time interval data or rotational speed can be used to detect slippage or locking of the cutter ring 15, or to calculate the current diameter of the cutter ring 15 assuming no slippage between the cutter ring 15 and the surface 91. The current diameter of the cutter ring 15 provides a measure of how much the ring 15 has been worn or eroded by the tunnel boring operation. As will be appreciated by persons of skill in the art, determining the amount of wear on the cutter ring 15 is very important. For example, maintenance procedures for a tunnel boring machine 90 often specify when the cutter assembly 10 should be replaced that is based on the percent wear of the cutter ring 15.

The rotational speed of the cutter ring 15, and in particular the time variation of the rotational speed, is also desirable to know because it provides an indicator of the rolling smoothness. A constant rotational speed of the cutter ring 15 (while the cutter head 93 is rotating at a constant speed) indicates that the cutter assembly bearings are functioning properly. An erratic rotational speed indicates the cutter ring 15 is slipping, and may therefore indicate that the bearings are failing and a component needs replacing. Alternatively, erratic rotational speeds for a significant number of cutter rings 15 may suggest modifying the operational parameters of the tunnel boring machine 90, to achieve optimum performance. For example, if the rotational speeds for a number of cutter rings 15 are erratic, this may indicate the cutter head 93 is being pressed too firmly against the surface 91.

The temperature of the cutter ring 15 is another indicator of how well the cutter assembly 10 is functioning. Friction between the cutter ring 15 and the surface 91 will generate heat. If the cutter ring 15 is rotating relatively freely, the measured temperature will reach a constant level. However, if the cutter ring 15 is not rotating freely, and is instead dragging or slipping across the surface 91, the temperature of the cutter assembly 10 will rise substantially and quickly. Similarly, if the cutter ring bearing is experiencing excessive friction, the temperature of the bearing will increase, causing the cutter assembly 10 temperature to rise. In either case, monitoring the temperature of the cutter assembly 10 provides an operator with an early indication that a problem exists, such that corrective action (such as shutting down the machine, or scheduling maintenance) may be undertaken (automatically or by the user) before more significant damage is done.

In an embodiment of the invention, one or more of the instrument packages 50 (hereinafter referred to as the reference instrument package), includes a dual axis accelerometer (not shown) in addition to the other sensors discussed above. The dual axis accelerometer is able to measure acceleration, including gravity, in two directions, typically orthogonally oriented directions. Functionally, the dual axis accelerometer includes a first accelerometer that is oriented perpendicular to a second accelerometer in a generally horizontal plane, e.g., one axis oriented radially to the cutter head 93 and the other oriented tangentially to the cutter head 93. The dual axis accelerometer measures when the cutter head 93 is rotating, and can be used to provide a reference point for locating individual cutter assemblies 10.

It will be appreciated by persons of skill in the art that the dual axis accelerometer on the reference instrument package can be located by analyzing the detected accelerometer values, as follows. The relative position of the dual axis accelerometer on the cutter head 93 is known. For example, a reference map of cutter assembly locations may be generated. The dual axis accelerometer displays positive or negative values of gravitational acceleration based on the particular orientation of the accelerometer. Therefore, the rotational orientation of the dual axis accelerometer can be determined with reference to gravity. The rotational orientation of the dual axis accelerometer, and its relative position on the cutter head 93 determines its position relative to the other cutter assembly instrument packages 50. By knowing the position of the reference cutter, the other cutters can also be located by referencing to the reference map of cutter assembly locations. This is desirable when a cutter assembly 10 is experiencing anomalous operating conditions and needs to be located in the cutter head 93 and inspected.

In the current embodiment, for each instrument package 50 the data measured by the accelerometers 32, magnetometers 33, and temperature sensors 34, are converted into digital signals by the processor 35 on the sensor control board assembly 31. This digital data is then transmitted through the antenna 37 to a remote receiver that may be disposed elsewhere on the tunnel boring machine 90. In the preferred embodiment, every cutter assembly 10 on the tunnel boring machine 90 is provided with one or two instrument packages 50, providing the clearest indication possible of boring conditions. This collection of many instrument packages 50 is known as a sensor network.

Data from the sensor network may be relayed to a display for the operator of the tunnel boring machine 90. Displaying data from each of the instrument packages 50 in relation to the location of each other instrument package 50 on the cutter head 93 would allow the operator to infer the structure of the rock and adjust the operating parameters accordingly to achieve maximum efficiency. For example, the vibration measurements from each instrument package 50, used in conjunction with the sensor mapping capability, would allow display of a map of the rock face with indications of rock conditions including, but not limited to, rock hardness, degree of fracturing, and any localized geological structures. This display can be effectively used to increase the production of the tunnel boring machine 90 by allowing the individual cutter assemblies 10 to operate closer to their design limits. Without this system, the operational envelope of each cutter assembly 10 has to be assumed as an average of the total loading of the machine, forcing overall operational parameters to be reduced. Local variations in the rock conditions seen by an individual cutter assembly 10 cannot be accounted for without this system, as the overall average loading is the only data available. By using an individual sensing system, the extreme phenomena can be detected and operating parameters can be adjusted to achieve the maximum load for each individual cutter assembly 10.

A current embodiment uses a sensor control board assembly 31 that is capable of two transmission pathways for sending data to the receiver. The transmission can be performed through a point-to-point protocol, in which data from each instrument package 50 is sent directly to the receiver, or it can be performed through a multi-hop mesh network protocol, in which the instrument packages 50 can work together and act as relays for the data. The current instrument packages 50 are capable of both transmission and reception of radio frequency signals through the antenna 37. With this dual capability, each instrument package 50 can receive data from other instrument packages 50 and pass this data on to the receiver. The primary advantage of the mesh network protocol is that the instrument packages 50 most distant from the receiver can use other instrument packages 50 closer to the receiver to relay their measured data, in case of insurmountable radio interference. Disadvantages of the mesh network protocol is the higher battery consumption rate and potentially higher signal traffic.

To alleviate battery consumption limitations, a power generation system which uses dynamic motion to create electrical power may be implemented. This would eliminate or mitigate the need for a battery pack 38.

Figure 5:
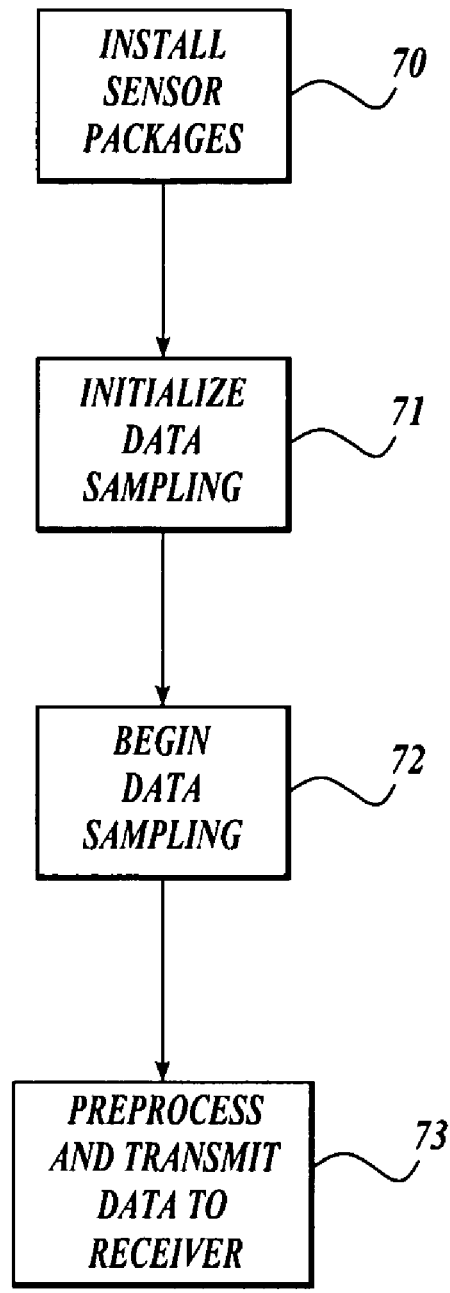
FIG. 5 is a block diagram outlining the operation of the cutter assembly monitoring system for the tunnel boring machine shown in FIG. 1.

FIG. 5 is a block diagram outlining the operation of a tunnel boring machine 90 equipped with instrument packages 50 according to the present invention. Instrument packages 50 are installed 70 on the associated cutter assemblies 10, with one end of each instrument package 50 directly contacting the associated cutter assembly 10.

If used, the reference cutter dual axis accelerometer (discussed above) is initialized or monitored upon installation 70, i.e., prior to initiating rotation of the cutter head 93. When the dual axis accelerometer signals changes in gravitational pull, the cutter head 93 is rotating. The instrument package 50 containing the reference cutter dual axis accelerometer then transmits a signal to the receiver indicating that the cutter head 93 is turning. The receiver, which can also act as a transceiver, then emits an initialization signal to the other instrument packages 50 to begin sampling data. This is the initialization phase 71 in the block diagram. It will be appreciated that if a reference dual axis accelerometer is not used, any other suitable signal may be used to detect or determine the cutter head is turning, and to initiate data sampling 71, as will be apparent to persons of skill in the art.

The sensor control board assembly 31 of the instrument package draws enough continuous power to monitor for signals transmitted from the receiver. When the initialization signal is received by the instrument packages 50, the instrument packages 50 begin sampling 72 their respective data.

The sampling 72 logic for each of the sensors 32, 33, 34 is different. For example, in a system using a reference accelerometer (as discussed above) in addition to the instrument package 50 accelerometers 32, the signals are relayed to the sensor control board assembly 31, and the reference accelerometer signal is subtracted from the detected relayed cutter accelerometer signal. The temperature sensor 34 takes temperature readings periodically at a pre-set rate. The magnetometer 33 samples the magnetic field continuously, so that when the magnet(s) 16 in the hub 12 pass near the magnetometer 33, the magnetic field is detected. When the detected magnetic field exceeds a pre-established limit, the sensor control board assembly 31 registers a count and calculates an instantaneous rotational speed of the cutter assembly 10 based on the time elapsed since the previous detection of magnet 16 passage. For example, the rotational speed may be calculated using the following equation: $RPM=(n/T)*60$ where T is the time in seconds elapsed between magnetic counts and n is the number of magnets 16 embedded in the hub 12. When the rotational speed of the cutter assembly 10 is known, the diameter of the cutter ring 15 can be calculated as: $D=(2*r*d)/R$ where r is the rotational speed of the cutter head 93 (in rpm), d is the distance to the cutter ring 15 center-plane from the center of the cutter head 93, and R is the measured rotational speed of the of the cutter assembly 10 as calculated above.

The data measured by the sensors is relayed to the sensor control board assembly 31, where it is encoded by the transceiver board 36 into a radio signal and transmitted 73 through the antenna 37. In order to save battery life, the transceiver is not continuously operating. Data is measured and recorded at specified time intervals, and a transmission interval is also established with a frequency appropriate for measuring the dynamic characteristics of the cutters. The sample and transmission intervals are not static values, but can be adjusted by programming the sensor devices. There is no single ideal sample period, as tunnel boring operations vary widely, based on parameters including rock characteristics, cutter ring 15 material, cutter load rating, and tunnel boring machine power. The flexibility inherent in this wireless system allows changing of the sampling conditions while boring to achieve the best data resolution and longest sensor life possible.

In a current embodiment of the instrument package 50, the selected accelerometers are ultra-compact low-power 3-axis linear accelerometers that include a sensing element and an IC interface, such as the LIS302DL from STMicroelectronics Company headquartered in Geneva, Switzerland. The selected accelerometer is capable of providing the measured acceleration data to external applications via an I2C/SPI serial interface. The selected temperature sensors 34 are thin film platinum resistance temperature detectors, for example a HEL-700 series Thin Film Platinum RTD from Honeywell International, Inc. headquartered in Morristown, N.J. The selected temperature sensors provide excellent linearity, stability and interchangeability. The selected magnetometers 33 are magnetoresistive sensors, for example position sensors 2SS52M, also from Honeywell International, Inc.

The accelerometer was chosen because it is inexpensive, very low power, has a digital interface and has built-in signal processing. It is contemplated that higher g-rated, higher power devices may alternatively be used, or a mechanical damper may be devised to bring the acceleration values within the constraints of the sensor. The temperature sensor was chosen because of its temperature range and low power requirement. However, these types of devices are readily interchangeable, and other temperature sensors may alternatively be used.

Various mote sensor communication topologies contemplated for the present system may be implemented according to the present invention.

For example, the instrument packages 50 may be interconnected in a mesh network such that if the wireless transceiver 36 is unable to communicate with the receiver directly, the signal can be relayed through other instrument packages 50 to the receiver. For example, a mesh networking protocol has been tested in network sizes having 20, 50 and 99 nodes, each node comprising or representing an instrument package 50, and a single base station or receiver. In the tests, the nodes were spaced approximately 1.5 feet away from any other node, and approximately thirty feet from the receiver. To improve the quality of service, or the ability to control the reliability of the network, the network may be operated with message acknowledgment (ACK) enabled, wherein a node will continue sending its signal until an ACK message is returned. Although the network topology operated reasonably well for smaller numbers of nodes, communication issues become significant as the number of nodes was increased to 99, and of course are more pronounced when ACK is enabled.

In another topology implementation, the wireless data network comprises a peer-to-peer (P2P) topology, wherein the wireless transceivers 36 communicate only directly with the receiver, that is, each sensor node reports directly to the base station. In a tested implementation, each sensor node is assigned a reporting time-slot within the reporting window. This allows each node to send a message to the receiver or base station with minimum chance of collision with other reporting nodes. It will be appreciated by persons of skill in the art that the P2P topology allows for much longer battery life because the transceivers 36 do not need to be continuously receiving/transmitting. The P2P topology also may be run in a no-ACK mode or in an ACK-enabled mode. The P2P topology tested to be much more reliable than the mesh network topology, particularly at larger numbers of nodes. However, it will be appreciated that if a node or instrument package 50 is in an RF dead spot, such individual nodes may perform poorly.

A very low average packet loss rate was achieved for the P2P topology with ACK enabled, such that each node can re-send a message up to 6 times if not confirmed received by the receiver (for example). In one test a 99-node, ACK-enabled P2P topology produced an average packet loss rate of only 3.5%

Testing indicated that a mesh network showed clear reliability advantages over a time-synchronized P2P network for deployment of up to fifty nodes, but at an energy cost approximately 26 times as high. With greater than 50 nodes, the P2P network reliability remains very good, whereas the mesh network deteriorates significantly. Moreover, it is expected that "dead spots" that hinder the reliability of P2P networks will be mitigated by motion of the tunnel boring machine.

Figure 6:
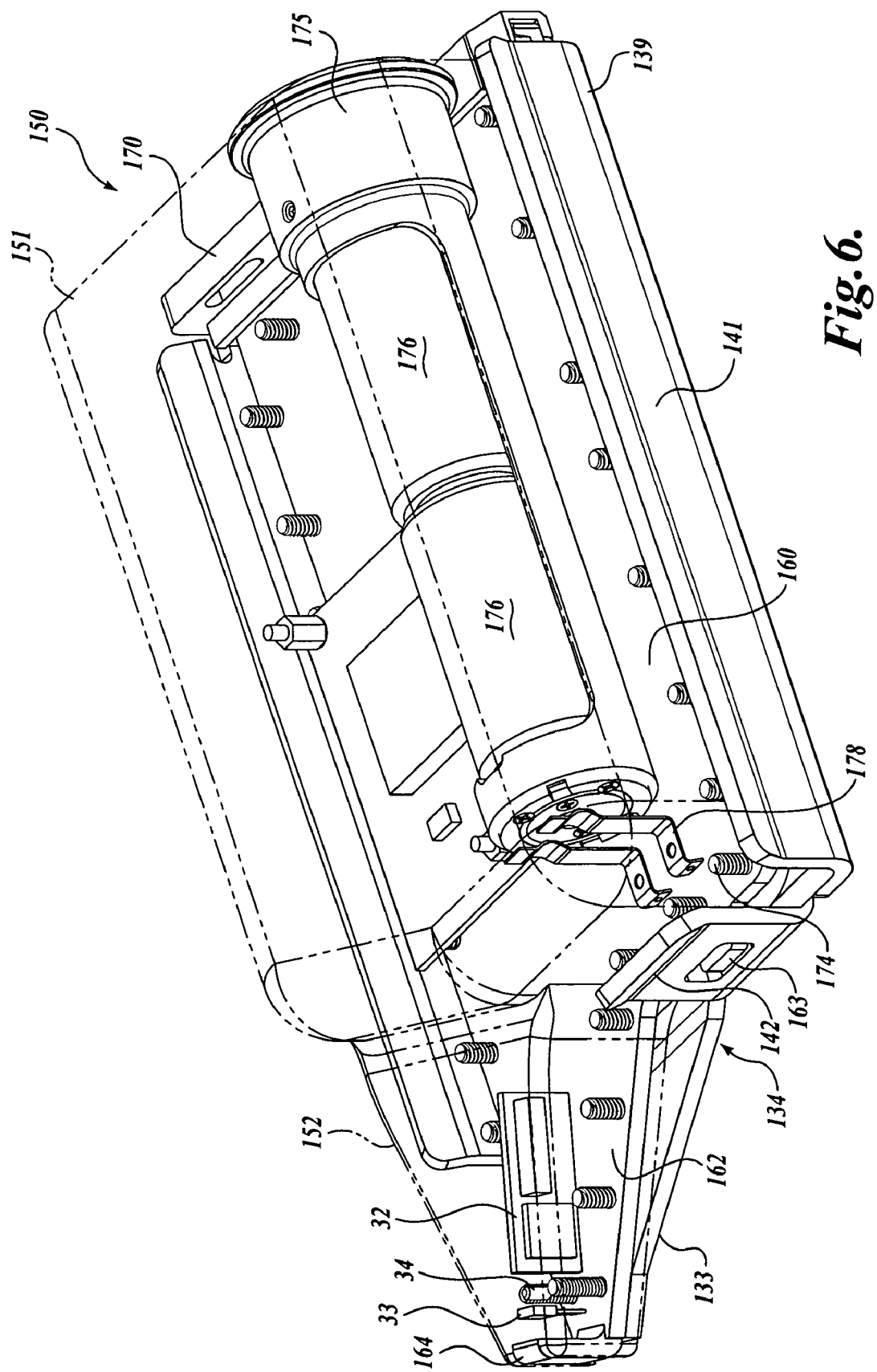
FIG. 6 shows a second embodiment of an instrument package in accordance with the present invention.
Figure 7:
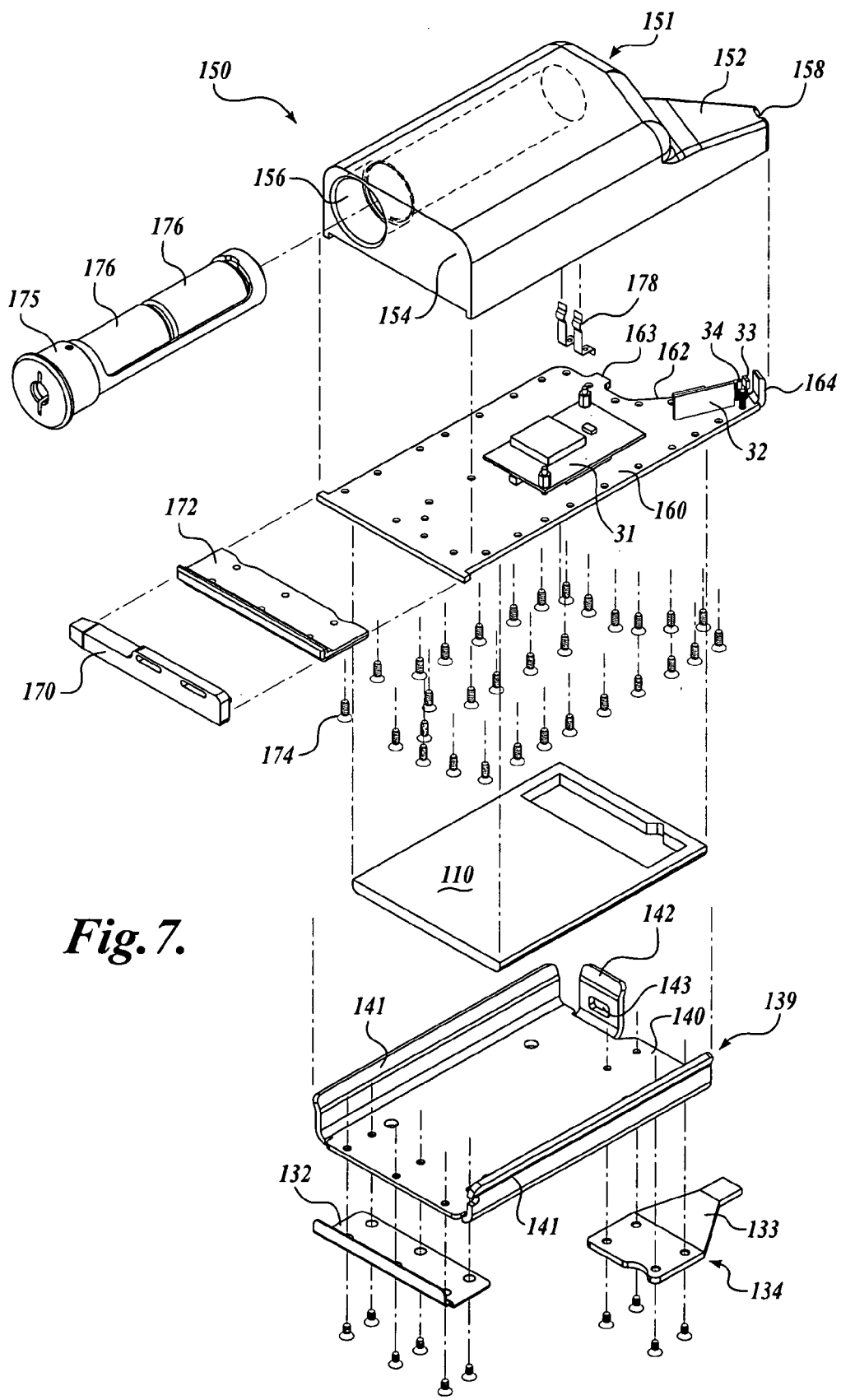
FIG. 7 is an exploded view of the instrument package shown in FIG. 6.

Another alternative embodiment of an instrument package or sensor package 150 for monitoring a cutter assembly 10 in accordance the present invention is shown in FIG. 6, wherein the outer housing 151 is shown in phantom. A partially exploded view of the instrument package 150 is shown in FIG. 7.

In this embodiment, it is contemplated that the instrument package 150 installed on the cutter assemblies 10 will include the same or a similar sensor package to the instrument package 50 described above. For example, in some embodiments no reference dual axis accelerometer is used to measure when the cutter head 93 is rotating and provide the reference point for locating sensors. Instead, the rotational measurement and reference point may be determined, for example, by placing two additional sensors in the system. A sensor may be placed on one of the TBM drive motors (not shown) to measure shaft rotational speed of the motor. The rotational speed measurement may be accomplished by installing a magnet on the drive shaft and using a magnetometer, by use of an optical sensor, or by any other means as are well-known in the art. By using gear ratio information for the machine and measuring the motor shaft rotational speed, the rotational speed of the cutter head 93 can be determined.

A second sensor may be provided to detect passage of a magnet installed on the cutter head 93 by use of a magnetometer enclosed in a protective housing. It is contemplated that both of these two additional sensors would transmit data back to the base station.

The sensor package 150 is adapted to be mounted directly to the cutter housing assembly for the associated cutter assembly 10. An advantage of the direct mounting is that the sensor package 150 does not interfere with the standard procedure for installing and removing cutters. A mounting bracket 139 supports the instrument package 150 on the cutter assembly 10, and may be fixedly or releasably attached directly to one of the housing mounts 20L, 20R (FIG. 2). For example, the mounting bracket 139 may be welded to one of housing mounts 20L, 20R, or attached by conventional hardware.

The mounting bracket 139 includes a bottom surface 140, oppositely disposed side walls 141, and a retaining tab 142 having a locking aperture 143. A protective spacing element 110 is disposed on the bottom surface 140 of the mounting bracket 139. A retaining bracket 132 attaches near a proximal end of the mounting bracket 139, and a spring element 134 attaches near a distal end of the mounting bracket 139.

A removable portion of the instrument package 150 includes a base plate 160 having a distal arm 162 with an upwardly-extending nose 164 that is adapted to engage an associated cutter assembly 10. The distal arm 162 supports the cutter assembly sensors, such as the accelerometer 32, magnetometer 33 and temperature sensor 34. The sensors are operably connected to the sensor control board assembly 31, which receives the sensor data and transmits it to the remote receiver, as discussed above.

The base plate 160 further includes a positioning tab 163 that is sized and positioned to engage the locking aperture 143 in the retaining tab 142. A seat 172 urges the base plate 160 towards a desired position within the mounting bracket 139, and a sliding clamp 170 releasably engages the retaining bracket 132. The base plate 160 is secured to an outer housing 151 with a plurality of screws 174. The housing 151 includes a main body portion 154, defining a battery aperture 156, and a distal arm portion 152 that overlies the distal arm 162 of the base plate 160. The distal arm portion 152 includes an end channel 158 that slidably receives the nose 164 extending upwardly from the base plate 160.

It can now be seen that the spring element 134 discussed above, attached to the mounting bracket 139, includes an angled arm portion 133 that abuts or engages the distal end of the base plate arm 162. The spring element 134 is sized and engineered to provide an elastic force on the distal arm 162 such that the nose 164 of the base plate 160 is elastically urged towards the associated cutter retainer 14 (FIG. 3). Elastic deformation of the distal arm 162 will therefore allow the nose 164 to maintain contact with the associated cutter retainer, even as the cutter experiences wear, over a range of wear patterns.

A battery holder 175 is adapted to hold one or more batteries 176 (two shown) for providing power to the sensors 32, 33, 34, sensor control board assembly 31 and related electronics, through terminals 178.

In a current embodiment, the outer housing 151 is made of a plastic material, and the mounting bracket 139 and base plate are metal, although other materials may be used including for example composite materials or the like. It will be appreciated that the instrument package 150 must be constructed of sturdy materials to withstand the very harsh environment near the cutter assemblies 10. All sensor electronics are potted in place using vibration dampening material in the sensor enclosure. The metal base plate 160 is assembled onto the outer housing 151, with the tip of the outer cover protected by the metal nose 164 on the base plate 160. The enclosure includes a removable battery compartment 175 to permit the replacement of batteries 176 in the field. This battery compartment 175 may include a switch for configuring the batteries to be in parallel or in series, thereby allowing the use of either alkaline or lithium metal batteries.

In this embodiment, the removable portion of the sensor package 150, including the base plate 160 (and various components mounted thereon) and the outer housing 151 may be removed by slidably releasing the sliding clamp 170, and sliding the removable portion from the mounting bracket 139.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus for monitoring a tunnel boring machine during operation, wherein the tunnel boring machine comprises a plurality of cutter assemblies having a rotatable portion mounted on a cutter head, the apparatus comprising:
   a plurality of instrument packages, each instrument package being associated with one of the plurality of cutter assemblies, each instrument package comprising i) a distal end that is in contact with the associated cutter assembly, the distal end of the instrument package containing a plurality of sensors for monitoring the associated cutter assembly, ii) a sensor control board operatively connected to the plurality of sensors, the sensor control board further comprising a transceiver adapted to wirelessly transmit data detected by the plurality of sensors to a remote receiver, and iii) a power supply connected to provide power to the sensor control board;
   wherein each instrument package further comprises a mounting bracket configured to fixedly attach the instrument package to a housing mount for the associated cutter assembly, and wherein the instrument package includes a removable portion that includes the plurality of sensors.

2. The apparatus of claim 1, wherein the plurality of sensors comprises an accelerometer, a temperature sensor and a sensor for measuring the rotational speed of the rotatable portion of the associated cutter assembly.

3. The apparatus of claim 2, wherein the sensor for measuring the rotational speed of the rotatable portion comprises a magnetometer.

4. The apparatus of claim 2, wherein the accelerometer comprises a multi-axis accelerometer.

5. The apparatus of claim 2, wherein the plurality of sensors further comprises a second accelerometer.

6. The apparatus of claim 1, wherein the plurality of instrument packages comprises at least one instrument package for each of the plurality of cutter assemblies.

7. The apparatus of claim 1, wherein the plurality of instrument packages comprises two instrument packages for each of the plurality of cutter assemblies.

8. The apparatus of claim 1, wherein the plurality of instrument packages are wirelessly interconnected in a mesh network protocol.

9. The apparatus of claim 1, wherein the plurality of instrument packages are wirelessly interconnected in a peer to peer network.

10. The apparatus of claim 1, wherein the plurality of sensors are mounted to a distal arm portion of a base plate, and further comprising a spring that biases the distal arm portion of the base plate towards the associated cutter assembly.

11. The apparatus of claim 1, wherein the power supply comprises a removable battery.

12. The apparatus of claim 1, wherein the removable portion comprises a base plate having a distal arm portion that supports the plurality of sensors, and further comprising a spring element that biases the base plate distal arm portion into contact with the associate cutter assembly.

13. A method for operating a tunnel boring machine having a plurality of cutter assemblies, each cutter assembly comprising a rotating portion, the method comprising the steps of:
   providing a plurality of instrument packages, each instrument package being associated with one of the plurality of cutter assemblies, and comprising a plurality of sensors that monitor the associated cutter assembly, a sensor control board that receives data from the plurality of sensors, and a power supply, wherein the instrument package is in direct contact with the associated cutter assembly, and further wherein the instrument package includes a mounting bracket configured to fixedly attach the instrument package to the tunnel boring machine, and a removable portion that includes the plurality of sensors;
   wirelessly transmitting data derived from the plurality of sensors to a remote receiver; and
   using the data transmitted to the remote receiver to control the operation of the tunnel boring machine.

14. The method of claim 13, wherein the plurality of sensors comprises an accelerometer, a temperature sensor and a sensor for measuring the rotational speed of the rotatable portion of the associated cutter assembly.

15. The method of claim 14, wherein the sensor for measuring the rotational speed of the rotatable portion comprises a magnetometer.

16. The method of claim 14, wherein the accelerometer comprises a multi-axis accelerometer.

17. The method of claim 13, wherein the plurality of instrument packages comprises at least one instrument package for each of the plurality of cutter assemblies.

18. The method of claim 13, wherein the plurality of instrument packages are wirelessly interconnected in a mesh network protocol.

19. The method of claim 14, further comprising elastically biasing a distal arm portion of the instrument package towards the associated cutter assembly to maintain the instrument package in contact with the associated cutter assembly.

20. A tunnel boring machine comprising:
a rotating cutter head that rotatably supports a plurality of cutter assemblies, each cutter assembly comprising a shaft rotatably supporting a cutter ring; and
a plurality of instrument packages, each instrument package being associated with one of the plurality of cutter assemblies, each instrument package comprising i) a distal end that is in contact with the associated cutter assembly, the distal end of the instrument package containing a plurality of sensors for monitoring the associated cutter assembly, ii) a sensor control board operatively connected to the plurality of sensors, the sensor control board further comprising a transceiver adapted to wirelessly transmit data detected by the plurality of sensors to a remote receiver, and iii) a power supply connected to provide power to the sensor control board;
wherein each instrument package further comprises a mounting bracket configured to fixedly attach the instrument package to a housing mount for the associated cutter assembly, and wherein the instrument package includes a removable portion that includes the plurality of sensors.

21. The tunnel boring machine of claim 20, wherein the plurality of sensors comprises an accelerometer, a temperature sensor and a sensor for measuring the rotational speed of the rotatable portion of the associated cutter assembly.

22. The tunnel boring machine of claim 21, wherein the sensor for measuring the rotational speed of the rotatable portion comprises a magnetometer.

23. The tunnel boring machine of claim 21, wherein the accelerometer comprises a multi-axis accelerometer.

24. The tunnel boring machine of claim 20, wherein the plurality of instrument packages comprises at least one instrument package for each of the plurality of cutter assemblies.

25. The tunnel boring machine of claim 20, wherein the plurality of instrument packages are wirelessly interconnected in one of a mesh network protocol and a peer to peer protocol.

26. The tunnel boring machine of claim 20, wherein the plurality of sensors are mounted to a distal arm portion of a base plate, and further comprising a spring that biases the distal arm portion of the base plate towards the associated cutter assembly.

27. An apparatus for monitoring a tunnel boring machine during operation, wherein the tunnel boring machine comprises a plurality of cutter assemblies having a rotatable portion mounted on a cutter head, the apparatus comprising:
a plurality of instrument packages, each instrument package being associated with one of the plurality of cutter assemblies, each instrument package comprising i) a distal end and wherein the instrument package is configured to be installed such that the distal end is in direct contact with the associated cutter assembly, the distal end of the instrument package containing a plurality of sensors for monitoring the associated cutter assembly, ii) a sensor control board operatively connected to the plurality of sensors, the sensor control board further comprising a transceiver adapted to wirelessly transmit data detected by the plurality of sensors to a remote receiver, and iii) a power supply connected to provide power to the sensor control board;
wherein each instrument package further comprises a mounting bracket configured to fixedly attach the instrument package to a housing mount for the associated cutter assembly, and wherein the plurality of sensors are mounted to a distal arm portion of a base plate, and further comprising a spring that biases the distal arm portion of the base plate towards the associated cutter assembly.

28. The apparatus of claim 27, wherein the plurality of sensors comprises an accelerometer, a temperature sensor and a sensor for measuring the rotational speed of the rotatable portion of the associated cutter assembly.

29. The apparatus of claim 28, wherein the sensor for measuring the rotational speed of the rotatable portion comprises a magnetometer.

30. The apparatus of claim 28, wherein the accelerometer comprises a multi-axis accelerometer.

31. The apparatus of claim 28, wherein the plurality of sensors further comprises a second accelerometer.

32. The apparatus of claim 27, wherein the plurality of instrument packages comprises at least one instrument package for each of the plurality of cutter assemblies.

33. The apparatus of claim 27, wherein the plurality of instrument packages comprises two instrument packages for each of the plurality of cutter assemblies.

34. The apparatus of claim 27, wherein the plurality of instrument packages are wirelessly interconnected in a mesh network protocol.

35. The apparatus of claim 27, wherein the plurality of instrument packages are wirelessly interconnected in a peer to peer network.

36. The apparatus of claim 27, wherein the power supply comprises a removable battery.

37. The apparatus of claim 27, wherein the means for attaching each of the plurality of instrument packages to the associated cutter assembly comprises a mounting bracket fixedly attached to the tunnel boring machine, and wherein the instrument package includes a removable portion that includes the plurality of sensors and the sensor control board.

38. The apparatus of claim 27, wherein the removable portion comprises a base plate having a distal arm portion that supports the plurality of sensors, and further comprising a spring element that biases the base plate distal arm portion into contact with the associate cutter assembly.

39. A method for operating a tunnel boring machine having a plurality of cutter assemblies, each cutter assembly comprising a rotating portion, the method comprising the steps of:
providing a plurality of instrument packages, each instrument package being associated with one of the plurality of cutter assemblies, and comprising a plurality of sensors that monitor the associated cutter assembly, a sensor control board that receives data from the plurality of sensors, and a power supply, wherein the instrument package is in direct contact with the associated cutter assembly;

elastically biasing a distal arm portion of the instrument package towards the associated cutter assembly to maintain the instrument package in contact with the associated cutter assembly;

wirelessly transmitting data derived from the plurality of sensors to a remote receiver; and using the data transmitted to the remote receiver to control the operation of the tunnel boring machine.

40. A tunnel boring machine comprising:

a rotating cutter head that rotatably supports a plurality of cutter assemblies, each cutter assembly comprising a shaft rotatably supporting a cutter ring; and a plurality of instrument packages, each instrument package being associated with one of the plurality of cutter assemblies, each instrument package comprising i) a distal end that is in contact with the associated cutter assembly, the distal end of the instrument package containing a plurality of sensors for monitoring the associated cutter assembly, ii) a sensor control board operatively connected to the plurality of sensors, the sensor control board further comprising a transceiver adapted to wirelessly transmit data detected by the plurality of sensors to a remote receiver, and iii) a power supply connected to provide power to the sensor control board;

wherein each instrument package further comprises a mounting bracket configured to fixedly attach the instrument package to a housing mount for the associated cutter assembly, and wherein the plurality of sensors are mounted to a distal arm portion of a base plate, and further comprising a spring that biases the distal arm portion of the base plate towards the associated cutter assembly.

* * * * *

UNITED STATES PATENT AND TRADEMARK OFFICE
CERTIFICATE OF CORRECTION

| | | |
|---|---|---|
| PATENT NO. | : 8,172,334 B2 | |
| APPLICATION NO. | : 12/475334 | |
| DATED | : May 8, 2012 | |
| INVENTOR(S) | : Lindbergh et al. | |

It is certified that error appears in the above-identified patent and that said Letters Patent is hereby corrected as shown below:

| COLUMN | LINE | ERROR |
|---|---|---|
| 8 | 55 | Delete the second occurrence of "of the" |
| 10 | 9 | Add "." after "3.5%" |
| 10 | 20 | After "accordance" insert --with-- |

Signed and Sealed this
Thirty-first Day of July, 2012

David J. Kappos
*Director of the United States Patent and Trademark Office*